(12) United States Patent
Pendleton et al.

(10) Patent No.: US 7,822,229 B2
(45) Date of Patent: Oct. 26, 2010

(54) MEASUREMENTS USING A SINGLE IMAGE

(75) Inventors: Rand Pendleton, Santa Cruz, CA (US); Marvin S. White, San Carlos, CA (US)

(73) Assignee: Sportvision, Inc., Chicago, IL (US)

( * ) Notice: Subject to any disclaimer, the term of this patent is extended or adjusted under 35 U.S.C. 154(b) by 0 days.

(21) Appl. No.: 12/546,299

(22) Filed: Aug. 24, 2009

(65) Prior Publication Data

US 2009/0310853 A1 Dec. 17, 2009

Related U.S. Application Data

(63) Continuation of application No. 11/172,340, filed on Jun. 30, 2005, now Pat. No. 7,680,301.

(51) Int. Cl.
*G06K 9/00* (2006.01)
*G06T 15/00* (2006.01)

(52) U.S. Cl. .................. 382/103; 382/154; 345/419

(58) Field of Classification Search ................. 382/103, 382/154; 345/7, 419, 619; 463/1; 348/135, 348/155, 169
See application file for complete search history.

(56) References Cited

U.S. PATENT DOCUMENTS

| 5,768,151 | A | 6/1998 | Lowy et al. |
| 5,808,695 | A | 9/1998 | Rosser et al. |
| 5,923,365 | A | 7/1999 | Tamir et al. |
| 6,229,550 | B1 | 5/2001 | Gloudemans et al. |
| 6,449,010 | B1 | 9/2002 | Tucker |
| 2005/0285877 | A1 | 12/2005 | Dengler et al. |
| 2007/0002039 | A1 | 1/2007 | Pendleton et al. |

*Primary Examiner*—Duy M Dang
(74) *Attorney, Agent, or Firm*—Vierra Magen Marcus & DeNiro LLP

(57) ABSTRACT

A method used in broadcasts of events is disclosed for identifying the coordinates of an object in world space from a video frame, where the object is not on the geometric model of the environment. Once the world coordinates of the object are identified, a graphic may be added to a video replay showing the object. The method may also be expanded in a further embodiment to identify a trajectory of an object over time moving through world space from video images of the start and end of the trajectory, where the object is not on the geometric model of the environment. Once the trajectory of the object in world space is identified, a graphic may be added to a video replay showing the trajectory.

35 Claims, 8 Drawing Sheets

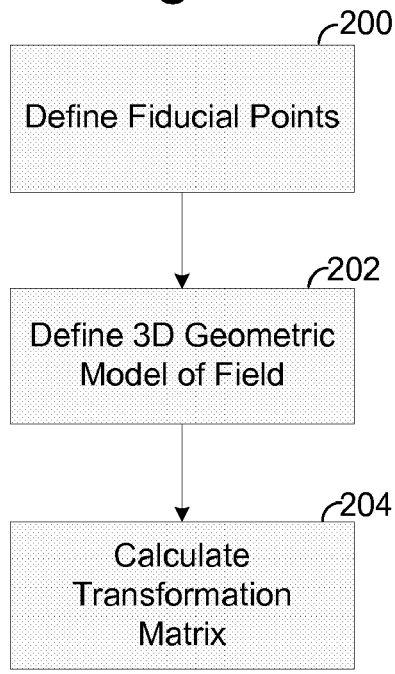
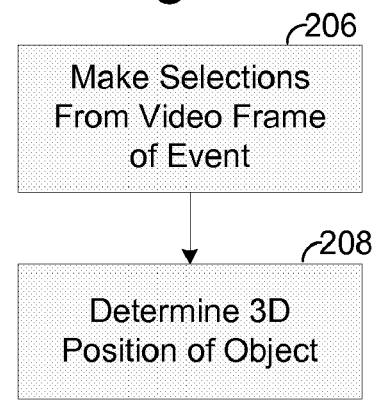
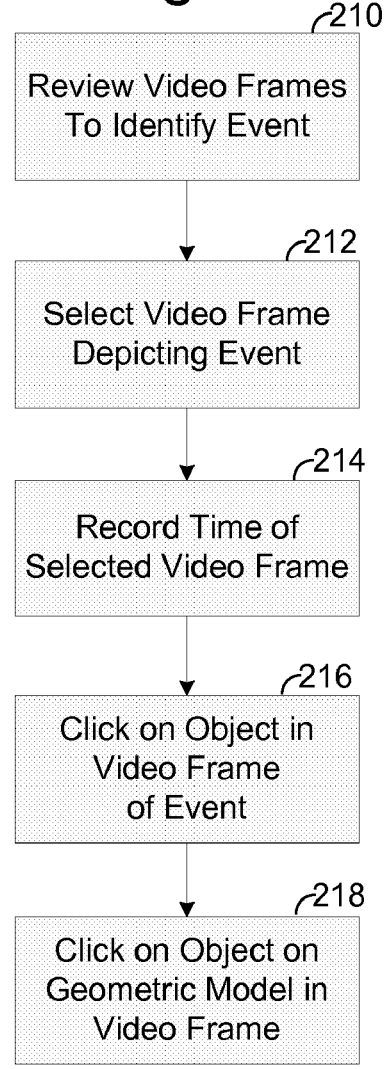

MEASUREMENTS USING A SINGLE IMAGE

PRIORITY DATA

This application is a continuation of U.S. patent application Ser. No. 11/172,340 entitled "MEASUREMENTS USING A SINGLE IMAGE," filed on Jun. 30, 2005, now pending.

BACKGROUND OF THE INVENTION

1. Field of the Invention

The present invention is directed to methods of determining measurements using a single image.

2. Description of the Related Art

It is known to enhance television broadcasts of events by providing graphics that are blended with other images or video to convey information to viewers. One system for blending a graphic into other images or video is described in U.S. Pat. No. 6,229,550 entitled, "Blending a Graphic." As disclosed in that reference, the blended graphic can be used in a wide variety of broadcast scenarios, such as broadcasts of sporting competitions and other events. For example, during the broadcast of a football game, a graphic can be employed to indicate the field location to which an offensive team must advance in order to obtain a first down. Logos and other graphics can also be blended with a video of an event. The graphic may be blended in with the live video feed, or in a replay of a live video feed.

One of the challenges in blending a graphic into a video is determining the position of a point in real world space from a depiction of that point in a two dimensional video image. In conventional systems, this may be done for example using in part the known registered camera position and view in real world space, and linear or nonlinear transformation equations to obtain the 3-dimensional position of a point in world space from a video frame showing that point. A time may be associated with a video frame to provide the time dimension of the point at the given position in world space. The registered camera orientation may be obtained from sensors associated with the camera that provide precise information relating to the pan, tilt, zoom and focal distance of the camera.

In conventional systems, this information alone is still generally insufficient to locate the position of a point in three dimensional space. In particular, what is lost when moving from a 2-dimensional video frame to real world space using a registered camera is the depth, or distance between the registered camera and the point in 3-dimensional space. That is, the ray, or "line of position," from the camera along which the point lies can be determined. But the actual distance between the camera and the point on the line of position is sometimes unknown.

In order to determine this distance, conventional systems use one of several methods. In a first of such methods, specific locations in the real world space being broadcast may be geometrically modeled. Prior to a broadcast, an operator can measure data from different points in the real world environment to be modeled. Each measured data point may be defined by an x, y and z value relative to an arbitrarily selected origin. For example, in an embodiment relating to football broadcasts, the origin may be selected at a corner of the end zone, the y-axis along the width of the field (e.g., the back of the end zone), the x-axis along the length of the field (e.g., the side line) and the z-axis extending vertically from the field. The operator can measure or use the yard markings on the field to determine the x and y coordinates for most points of interest on the field. A laser plane can be used to measure the corresponding z coordinate. The measured data points may be used to define the geometric model (either using the measured points themselves, or fitting the measured data points to one or more curves that mathematically represent the real world environment of the broadcast).

Using the geometric model of the field, the registered parameters of the camera, and the known position of the camera in the geometric model, a real world position of any point may be determined from a 2-dimension image of that point, provided the point lies on the geometric model. In this instance, the world 3-dimensional location of the point is the intersection of the known line of position through the point with the known geometric model of the environment.

At times, it may be desired to locate the 3-dimensional position of a point that may not lie on the geometric model. For example, a thrown football or baseball is generally not defined on the geometric model of the environment. In this instance, a conventional method used to determine the real world position of a point at a given time is to use two registered cameras, or one registered camera in two different locations. In this method, the line of position from the first and second camera views through the point intersect each other at the point. Using matrix transformation, together with the registered positions of the camera views, the position of the point in 3-dimensional world space may be determined.

None of the above-described methods contemplate determining the position of a point in the world space not included on the geometric model using only a single video image.

SUMMARY OF THE INVENTION

The present invention, roughly described, relates to a method used in broadcasts of events, for determining a position of an object, or the position of a path of the object over time, and then (optionally) adding a graphic to the 2-dimensional video frame replay of the object or path of the object.

In some embodiments, before the method of the present invention may be used to determine a measurement from a video frame, a setup process is performed which provides information regarding the environment being broadcast, as well as information relating to the cameras within the environment that provide the video of the broadcast. In one example, the setup process determines a geometric model of the environment of the broadcast, and determines a mathematical relationship allowing positional translation between 3-dimensional world space and 2-dimensional screen pixel space. This mathematical relationship may be in the form of transformation equations such as a transformation matrix or non-linear transformation equations for each camera providing video during an event. The transformation equations enable a pixel position on a video frame from a camera to be translated into a 3-dimensional world position depicted at the screen pixel of the video frame, and visa-versa.

After the set-up, once an event has been captured on video, the video frames are reviewed to identify the frame showing the captured event. The captured event may for example be a football player throwing a football. Using a pointing device graphical interface, an operator selects two points from the identified video frame. The first may be the object of interest. The second may be a point on the known geometric model of the environment which approximates a projection of the object of interest in some known direction onto the geometric model. For example, where a player is in the act of throwing a football, the second pixel may be the player's foot on the playing surface, as the player's foot may be a good approximation of a projection of the football along the vertical axis onto the playing surface.

From these selected points on the video frame, the 3-dimensional location of the object above a surface of known geometry can be measured. In particular, first and second lines of positions are computed, which lines of position are 3-dimensional rays from the camera and passing through the 3-dimensional points corresponding to the two selected points in the video frame. The ray that goes through the geometric model defines a point intersection with the geometric model. From this point, a ray may be computed in the direction of the projection of the object onto the geometric model. For example, where the player's foot was selected as the second pixel in the video frame, the 3-dimensional ray from the known surface may be computed as an up-vector from the player's foot on the playing field along the vertical axis.

The 3-dimensional position of the object of interest will be the point along the line of position through the object which represents the point of closest approach to the projection ray. This point of closest approach may be determined mathematically from the parametric equations of the line of position through the object and the projection ray.

In embodiments where an object is captured in video over time, the above process may be repeated with respect to a video frame at the end of the captured event to determine the 3-dimensional position of the object at the end of the captured event. Using the 3-dimensional start and end points, the elapsed time between the start and end of the captured event, and the known forces acting on the object, a 3-dimensional trajectory of the object may be computed using physics and mathematics. Once the 3-dimensional trajectory of the object is known over time, the trajectory of the object may be translated back into 2-dimensional pixel space for all frames in the captured event. The identified pixels may then be modified to produce a graphic showing the trajectory of the object during a replay of the captured event.

BRIEF DESCRIPTION OF THE DRAWINGS

FIG. 2 is a flowchart for a set-up and calibration process for modeling the environment.

FIG. 3 is a high level flowchart of a method according to embodiments of the present invention.

FIG. 4 is a flowchart of a method for selecting objects from a frame of video according to embodiments of the present invention.

DETAILED DESCRIPTION

The present invention pertains to methods of determining measurements using a single image. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Embodiments of the present invention provide a method for determining a position of an object from a single two-dimensional image. The image may be a video frame, a video field, other video format or a digitized image from other sources. The position can be determined in an (x, y, z) coordinate system or another coordinate system. In some embodiments, a four dimensional position is determined, where the fourth dimension is time, t. In other embodiments, a three dimensional position is determined. Some embodiments can also include determining a two dimensional position.

As shown in the figures and described herein after, embodiments of the present invention may be used to identify the position of a football during a broadcast of a football game. However, in general, embodiments of the present invention may be used to locate stationary objects or track the flight or movement of a variety of other objects (e.g., baseball, basketball, golf ball, tennis ball, volley ball, soccer ball, bowling ball, billiard ball, hockey puck, race car, etc.), or any other object undergoing defined or undefined motion during a broadcast of a sporting competition. It is further understood that the present invention is not limited to use in association with sporting competitions, and may alternatively be used to track a variety of other objects in flight, such as for example aircraft and other flying objects.

Figure 1:
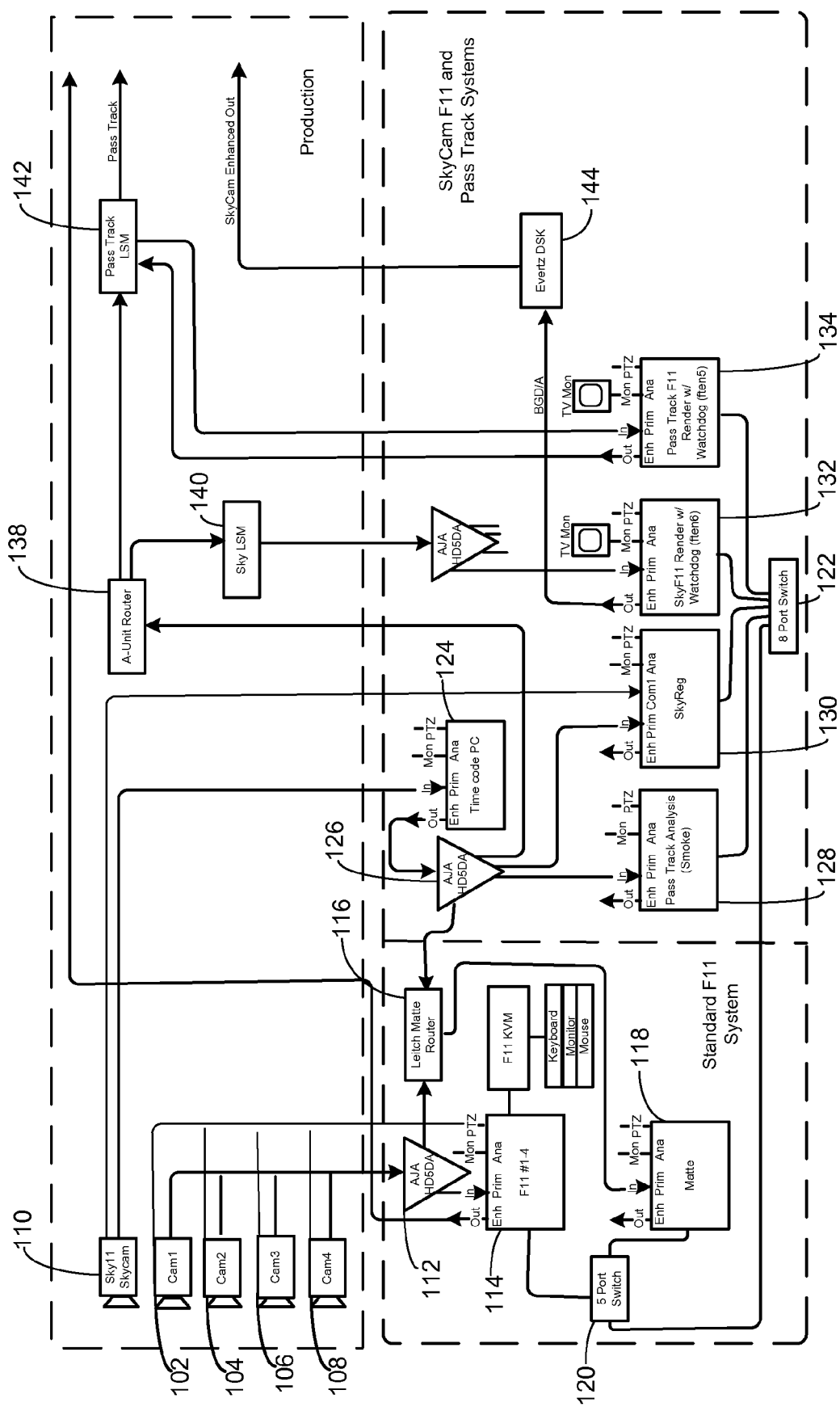
FIG. 1 is a block diagram of a hardware configuration suitable for implementing embodiments of the invention.

FIG. 1 is a block diagram of one embodiment of a hardware configuration capable of performing the present invention. FIG. 1 shows four ground-based cameras 102-108, and an aerial camera 110. It is understood that the present invention may operate with greater or fewer than four ground-based cameras, and greater or fewer than one aerial camera in alternative embodiments of the present invention. Moreover, although a plurality of cameras 102-110 are disclosed, embodiments of the present invention allow measurements to be made using only a single image from a single camera.

Each of the cameras 102-108 is known in the art and may for example include a Vinton Vector 70 camera head and a Canon J55 Super lens, although the camera configuration may vary in alternative embodiments. The aerial camera 110 is known in the art and may be an unmanned device, operating on a series of wires above the playing field and capable of moving in three dimensions. In embodiments, aerial camera 110 may for example be a high definition progressive scan point-of-view (POV) camera such as model number AK-HC900 manufactured by Panasonic. Other camera types are contemplated. For example, the aerial camera may be mounted on a flying vehicle such as a blimp, balloon, airplane or helicopter. As described hereinafter, the single video image from which measurements are made may come from aerial camera 110. However, the image may come from any of cameras 102-110 in embodiments of the invention.

Each of cameras 102-110 has associated with it one or more camera view sensors. In an embodiment, a set of sensors associated with each camera may include one or more of a zoom sensor, a pan sensor, and/or a tilt sensor. Details relating to the respective sensors are disclosed in greater detail in U.S. Pat. No. 6,229,550 entitled "Blending a Graphic," which patent is incorporated by reference herein in its entirety ("the '550 patent"). Aerial camera 110 may similarly include one or more of the pan, tilt, and zoom sensors as disclosed and described in the '550 patent.

Connected to each camera 102-110 is a 2× extender, a zoom lens, and a means of focusing the camera. A zoom sensor receives an electrical signal from all three of these devices in order to sense the zoom of the camera, the focal distance of the camera, and whether the 2× extender is being used. The analog signal is converted to a digital signal and transmitted to a processing device described below.

Video from each of cameras 102 through 108 is sent to a video replicator 112, which makes copies of the video signals received from respective cameras 102 through 108, and outputs those copies to various locations. One output goes to processing devices 114. Processing devices 114, may, for example, be desktop or other computers, or dedicated microcontrollers. Each of cameras 102 through 108 may have its own dedicated processing device 114. Alternatively, a single processing device 114 may be provided in alternative embodiments for receiving data from each of the cameras 102-108. Processing devices 114 receive both the video feed from cameras 102 through 108 and feedback from each of the pan, tilt, and/or zoom sensors associated with each of the cameras 102 through 108, respectively.

Video signals from the replicator 112 are also sent to a router 116, which receives all of the video from the cameras 102 through 108 and an operator may select video from one camera to be forwarded to processing device 118. Processing device 118 handles inclusions and exclusions as applied to a video image. An inclusion is a set of characteristics that describe a class of pixels that can be modified in the video. An exclusion is a set of characteristics that describe a set of pixels that are not to be modified in the video. The process of working with inclusions and exclusions is described in greater detail in applicants' '550 patent, previously incorporated by reference. However, in general, when blending the graphic to a video, the graphic may be blended on a pixel by pixel basis taking into account whether a given pixel in the video is an inclusion or an exclusion. In an alternate embodiment, the video and graphic are blended at a polygon level.

In one embodiment, the creation of an inclusion or an exclusion comprises an identification of luminance and/or chrominance characteristics for pixels. The process of creating inclusions and exclusions includes the steps of choosing an area of a video frame which identifies a set of pixels. An indication is made as to whether the set of pixels will be used to create an inclusion or an exclusion. If the pixels are to be used to generate an inclusion, then a display filter is created which describes the characteristics of the pixels in the set. If the pixels are to be used to create an exclusion, then the system generates a protection filter which describes the characteristics of the pixels in the set.

The display and protection filters from processing device 118 are then forwarded to one or more of processing devices 132 and 134, which add a graphic to a video as explained hereinafter. The video may be forwarded via a connections 120, 122, which may be Ethernet or other connections.

In embodiments, video feed from aerial camera 110 is fed to a time code processing device 124 which records a time code in the first few top lines of each frame of video received, or in the vertical blanking interval. It is understood that time codes may be recorded elsewhere on the video frames received in alternative embodiments. The time codes are used to identify the time of a captured event as explained in greater detail below, as well as to identify video as coming from a camera that is used to generate a graphic in accordance with embodiments of the invention.

Video from processing device 124 is sent to another video replicator 126, which makes copies of the video and forwards it to various locations. One copy of the video goes to router 116, where it may be selected by the operator as described above. Other copies of the time coded video are forwarded to processing devices 128 and 130 described below.

The processing device 128 is provided for mathematically determining the equation of motion of an object mapped between 2-dimensional and 3-dimensional space. The processing device 128 has associated with it a monitor and pointing device such as a mouse. The processing device 128 receives video from aerial camera 110, and allows an operator to scroll through the video one frame at a time. The processing device 128 further includes a graphical user interface allowing the operator to click on a pixel of a video frame displayed on the monitor, at which pixel is located an object of interest, such as for example a football, or a player's foot, as explained in greater detail below. Once the information is entered by the operator, the processing device determines one or more equations describing the 3-dimensional motion of an object over time as captured on video as explained in greater detail hereinafter.

The hardware according to embodiments of the present invention further includes a processing device 130 which performs a set-up and calibration process for obtaining a geometric model of the football field or other broadcast environment. Processing device 130 also computes transformation equations for each camera 102 through 110, which transformation equations for a given camera allows translation between a point in 3-dimensional space and its corresponding 2-dimensional screen space when viewed through that camera. The computation of the geometric model and the transformation equations are explained in greater detail hereinafter.

Information relating to the equations describing the 3-dimensional motion of the object over time within the environment from processing device 128, and information relating to the geometric model and transformation equations from processing device 130, is forwarded to one or both of processing devices 132 and 134. Processing devices 132 and 134 store this information for each time coded video frame. Using the stored information, processing devices 132 and 134 in turn may receive a portion of video, and determine whether information for adding a graphic to the respective video frame of the portion of video is stored. If so, the processing device 132 or 134 may add a graphic to the portion of video.

In embodiments, processing device 132 may be used to add a graphic relating to characteristics in the environment, such as for example a first down line on a football field. Processing device 134 may alternatively be used add a graphic relating to characteristics in the environment, as in processing device 132, and may additionally add a graphic showing the location or motion of an object according to embodiments of the present invention. Processing device 132 may be omitted in alternative embodiments.

Time coded video from processing device 124 is additionally sent to a production unit 138, where an operator may select video to be sent to either processing device 132 or processing device 134 for addition of a graphic to the video. For example, the video feed may be sent to LSM 140, which may be a high end DVR. There, an operator may select a portion of video and send it to processing device 132 for addition of a graphic to that video. Alternatively, the video feed may be sent to LSM 142, which again may be a high end DVR. There, an operator may select a portion of video and send it to processing device 134 for addition of a graphic to that video.

Once a graphic is added to the selected portion of video by processing device 132 or 134, the video may be sent to a device 144, such as a downstream keyer, which blanks out the time codes recorded in the time code processing device so that the time code is not visible in the broadcast video. (While device 144 is shown receiving video from only processing device 132, it is understood that both processing devices 132 and 134 may forward video to device 144). From there, the video having the added graphic may be broadcast.

It is understood that the method according to the present invention may be implemented using hardware components in addition to or instead of the above-described hardware components. Moreover, while FIG. 1 shows separate processing devices 114, 118, 124 and 128 through 134, it is understood that one or more of these processing devices may be combined into a single processing device in alternative embodiments of the present invention.

Before the method of the present invention may be used to determine a measurement from a single video image, a setup process as shown in the flowchart of FIG. 2 is performed to obtain a geometric model of the environment of the broadcast, and to determine transformation equations for each camera providing video during an event. The transformation equations may comprise a 4×4 transformation matrix. In addition to linear transformations, it is sometimes necessary to correct for lens distortion using nonlinear transformation equations. Radial distortion is known in the art to be corrected using a cubic equation.

The transformation equations enable a pixel position on a video frame from a camera to be translated into a world 3-dimensional line of position ray from that camera through the real world position depicted at the screen pixel of the video frame. The process shown in FIG. 2 may be performed before the live event, but it is conceivable that the processes of FIG. 2 could be performed at the start of or during a live event in alternative embodiments.

The setup process of FIG. 2 begins in step 200 with the selection of a plurality of defined three-dimensional fiducial points for the purpose of creating a geometric model of the environment to be broadcast. An operator will measure data from different points in the environment. In one embodiment, each data point includes x, y and z values. Any method can be used to obtain these x, y and z values. One example of a suitable method is to use a laser plane for z values and a laser range finder for x and y values, or other surveying devices. For example, the environment being modeled may be a football field. The first step is to create a coordinate system. For simplicity, assume the origin is at the near corner of the left end zone, the y-axis is along the width of the field (e.g. the back of the end zone), the x-axis is along the length of the field (e.g. the side line) and the z-axis extends vertically from the field.

The operator can measure or use the yard markings on the field to determine the x and y coordinates for most points of interest on the field. A laser plane can be used to measure the corresponding z coordinate. The laser plane is utilized by placing the laser plane at the origin (or another point) and reading the laser image off a pole that is positioned at the point of interest. In one embodiment, data samples are taken for the back of both end zones, both goal lines, both 20 yard lines and both 40 yard lines. For each yard line measured, measurements should at least be taken at each side line and in one or more points between the side lines, including the middle of the field. Additional data points can also be taken. If the environment includes parts of the stadium, the laser plane, a measuring tape or another measuring device can be used (as well as simple geometry) to determine data for other points in the environment.

In one embodiment, the data points measured in step 202 can be used to simply create the model. That is, data points can be plotted and connected (symbolically). In another embodiment, a set of curves are created using the measured data. That is, if the data is taken for a number of points along a line (e.g. 20 yard line, 40 yard line, edge of a wall, etc.) then that line can be modeled by fitting the data into a curve of the form $A+By+Cy^2=z$. Thus, any point on a yard line can be found using that equation because it is assumed that every point on the yard line has the same x value. As the y value changes, the z value will also change. Similar curves can be used to represent other lines. For example, a side line (as opposed to a yard line) can be modeled with the equation of the form $A+Bx+Cx^2=z$. Other lines in the environment can use either one of these two equations or different equations. If the system wants to find the z value for a point between two curves, the system can use linear interpolation. After step 202 is complete, the system has a set of curves. This set of curves constitutes the 3-dimensional geometric model of the environment.

While the geometric model described above and used hereinafter may be a 3-dimensional surface, it would be appreciated by those of skill in the art that the geometric model may alternatively be a known line or a point.

Transformation equations may then be calculated in a step 204 for each camera to be used in a broadcast. A variety of different methods may be used to calculate the transformation equations for a given camera depending on the type of camera used. For example, for ground-based cameras 102-108, the known x, y, z position of the camera front nodal point (or pinhole in the pinhole model of a camera) in three-dimensional space, together with the known tilt, pan, and zoom parameters of the cameras may be used to calculate the transformation equations for each of those cameras. A more detailed explanation of the method for calculating the transformation equations for ground-based cameras is set forth in applicant's '550 patent, previously incorporated by reference.

At times, the precise x,y,z location of the front camera node may not be known and/or sensors used to provide pan, tilt, zoom, and other parameters may not be sufficiently precise to allow accurate calculation of the transformation equations. For example, aerial camera 110 may travel along a wire over a field or broadcast environment, and the precise position of aerial camera 110 may not be fixed or defined. Thus, in an alternate embodiment of the present invention, a transformation equations for a given camera may be determined using a non-linear least squares method such as, for example, the Levenberg-Marquardt method. The Levenberg-Marquardt method is described in greater detail, for example, in Levenberg, K. "A Method for the Solution of Certain Problems in Least Squares." Quart. Appl. Math. 2, 164-168, 1944, and Marquardt, D. "An Algorithm for Least-Squares Estimation of Nonlinear Parameters." SIAM J. Appl. Math. 11, 431-441, 1963. These papers are incorporated by reference herein in their entireties.

In general, the non-linear least squares method for calculating the transformation equations for a given camera involves starting with a best guess of transformation equations for a given camera, for example aerial camera 110. Using these best guess transformation equations, the three-dimensional geometric model of the environment and fiducial points determined in steps 200 and 202 are translated into a 2-dimensional image. This image is then superimposed over the video frame of the environment displayed on the monitor associated with processing device 130. An operator may then select fiducial points from the superimposed image on the monitor using the pointing device and drag those fiducial points over to the position where those fiducial point show up in the video frame on the monitor.

For example, if the broadcast is of a football game, a best guess of the transformation equations is made and those transformation equations are used to generate a 2-dimensional image of the geometric model of the football field. The 2-dimensional image of the modeled football field is then superimposed over a video frame of the football field. Next, a first corner of an end zone from the superimposed image is clicked on and dragged over to the corresponding corner of an end zone shown in the video frame; a second corner of an end zone from the superimposed image is clicked on and dragged over to the corresponding corner of an end zone shown in the video frame; etc.

This process instructs processing device 130 to associate a plurality of three-dimensional locations of particular fiducial points with corresponding pixels in a video frame. This data is fed to processing device 130, which updates and modifies the best guess for the transformation equations on a frequent basis based on the click and drag process. Thus, when completed, the error of the 3-dimensional geometric model known to the processing device, and what the operator is telling the processing device the 3-dimensional model is, is minimized.

This non-linear least squares method results in an accurate calculation of the transformation equations for a given camera. It is understood that other non-linear least square methods may be used to determine the transformation equations for a given camera, including, for example, Tsai's algorithm described for example in a paper by R. Y. Tsai, entitled "An Efficient and Accurate Camera Calibration Technique for 3D Machine Vision," published in the proceedings of the IEEE conference on computer vision and pattern recognition, Miami Beach, Fla., pp. 364-384, 1986, which publication is incorporated by reference herein in its entirety.

Once the transformation equations are calculated by one or more of the above methods for a given camera, these equations may be used to translate a 3-dimensional world point into a pixel location in 2-dimensional screen space on a video frame from that camera. The translation method is known, and is described for example in the '550 patent, previously incorporated by reference. However, in general, the method involves two steps. First, a point (x,y,z) in 3-dimensional space is translated into undistorted screen space $(s_x, s_y)$. In one embodiment, a calculated 4×4 transformation matrix, M may be used:

$$Mw = s \quad (1)$$

-continued $$w = \begin{pmatrix} x \\ y \\ z \\ 1 \end{pmatrix}, s = \begin{pmatrix} s_{xs} \\ s_{ys} \\ w \\ q \end{pmatrix}.$$

The final undistorted pixel coordinates $(s_x, s_y)$ are computed from s by dividing the first and second components of s by the third component, i.e.:

$$s_x = \frac{s_{xs}}{w} \quad (2)$$
$$s_y = \frac{s_{ys}}{w}$$

Thereafter, the system takes into account lens distortion. That is, each undistorted two-dimensional pixel position $(s_x, s_y)$ is evaluated in order to determine if the two-dimensional position should change due to lens distortion. For a given two-dimensional pixel position, the magnitude of a radius from the optical center to the two-dimensional pixel position is determined. Lens distortion is accounted for by moving the pixel's position along that radius by an amount ΔR:

$$\Delta R = K(R)^2 \quad (3)$$

where R equals pixel distance from the optical center to the 2-dimensional position, and K is a distortion factor for that lens. The inverse for the distortion calculation may be accomplished by numerical methods, which sufficiently approximate the inverse equation.

As explained hereinafter, the reverse process and inverse of the transformation matrix are used in methods according to the present invention to go from a 2-dimensional screen space to 3-dimensional world space.

An embodiment of the present invention used to determine the four-dimensional location of an object from a captured event displayed in a video image of that object will now be explained in general with reference to the flowchart of FIG. 3. In embodiments of the present invention, the object may, for example, be a football which is being held, thrown, caught, or otherwise not positioned on the known 3-dimensional geometric model of the field. As indicated above, other objects are contemplated. In general terms, a method according to this embodiment comprises the steps of making selections from a video frame of a captured event (step 206), and then determining the three-dimensional or four-dimensional position of the point or object shown in the captured event using certain defined parameters and assumptions regarding the environment (step 208).

Figure 7:
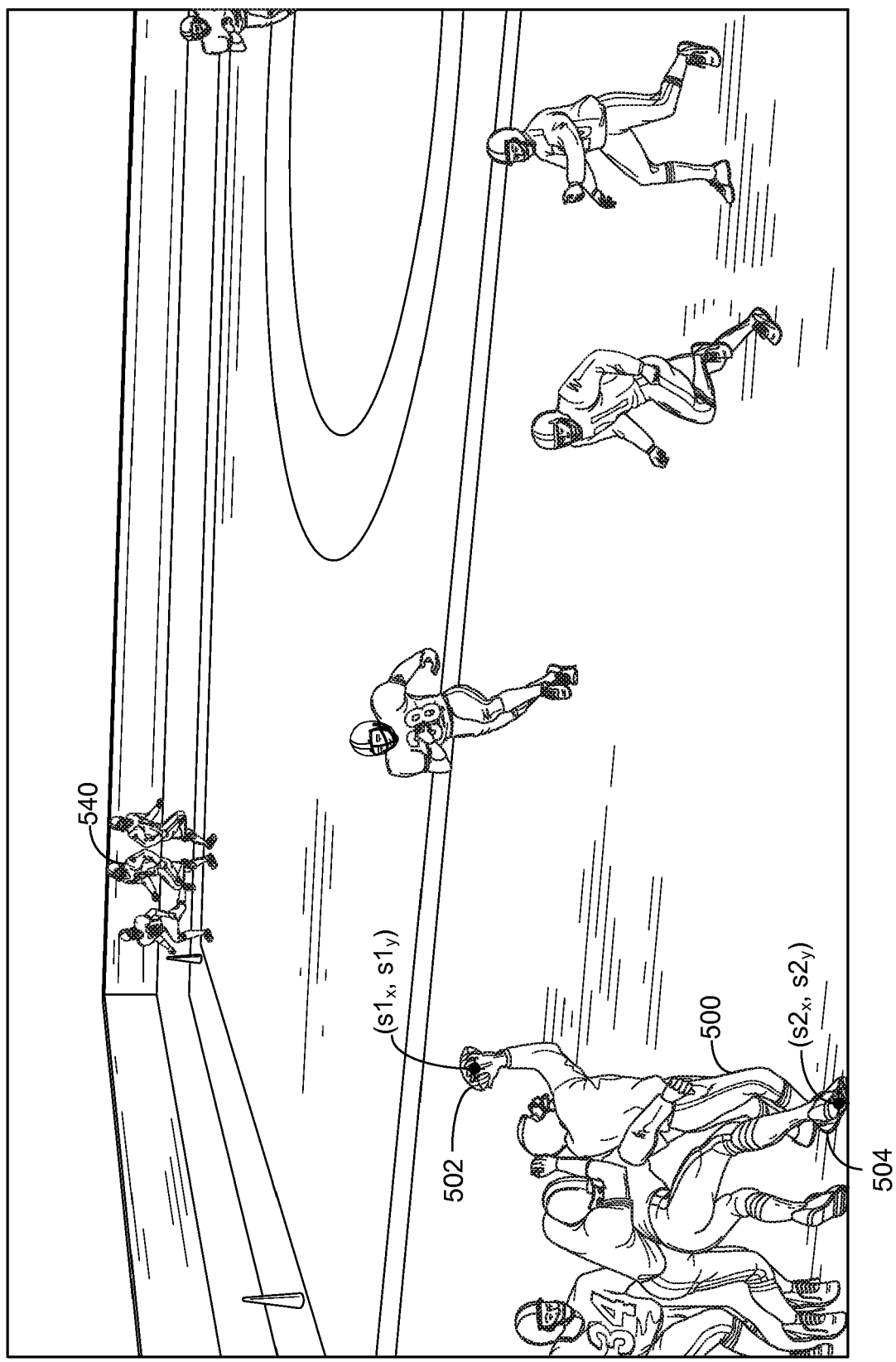
FIG. 7 is a perspective view of a video frame taken at a first time of a sporting competition used in embodiments of the present invention

Step 206 of making selections from a video frame will be explained in greater detail now with respect to the flow chart of FIG. 4 and the illustration of a video frame shown in FIG. 7. In one example as indicated, the present invention may be used to determine the real world position of an object such as a football at the point it is being thrown by a player during a football game. In accordance with such an embodiment, an operator would review video frames (step 210) from a single camera. The camera used in embodiments described hereinafter is aerial camera 110, but may be any of cameras 102-110 in embodiments. The video frames are reviewed after a captured occurrence has occurred (but, in some cases, during the sporting event) to identify the video frame showing the captured occurrence (step 212). Thus, as shown for example in FIG. 7, an operator may review frames of video until the video frame of a player 500 throwing the football 502 is found. The video may be reviewed on a monitor associated with processing device 128 (FIG. 1).

Once the video frame is identified, the time code of the video frame may be recorded (step 214). The operator may then use a pointing device to click on the object shown in the video frame (step 216). An object may be "clicked" by the known process of using the pointing device to position a cursor on the monitor over the desired object and then selecting the object by actuating a button on the pointing device. Thus, referring to the video frame shown in FIG. 7, the operator may position the screen cursor over a pixel ($s1_x$, $s1_y$) at the center of the object, and then that pixel may be selected using the pointing device.

Next, in a step 218, the operator selects a second pixel ($s2_x$, $s2_y$). The operator selects pixel ($s2_x$, $s2_y$) where a portion of the player 500 comes into contact with the known geometric model, such as for example, the playing surface in FIG. 7. Where player 500 is in the act of throwing a football, the second pixel ($s2_x$, $s2_y$) may be the foot 504 of player 500 on the playing surface. It is understood that other portions of player 500 in contact with a playing field during a captured event may be used as point ($s2_x$, $s2_y$) in alternative embodiments of the present invention. In a more general embodiment, the second point selected may be other positions located on the known geometric model of the environment being broadcast.

Figure 5:
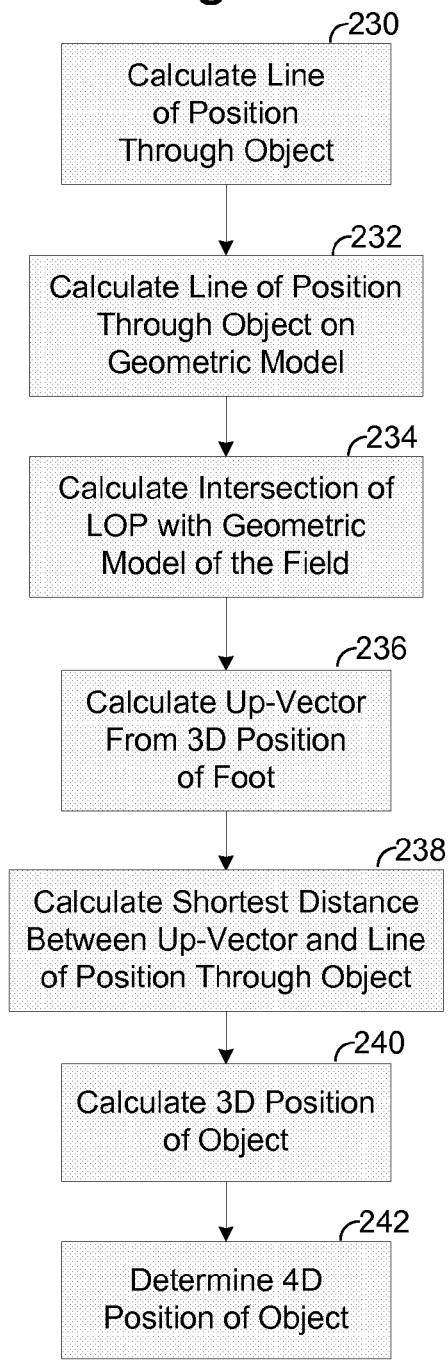
FIG. 5 is a flowchart of a method for calculating a 3-dimensional position of an object from a depiction of that object in a 2-dimensional video frame according to embodiments of the present invention.

Once the step 206 in FIG. 3 of making selections from a video frame has been accomplished as described above, the step 208 is performed. Step 208 calculates a 3-dimensional position of an object from a depiction of that object in a 2-dimensional video frame. Step 208 is explained in greater detail hereinafter with respect to the flow chart of FIG. 5, the real world perspective view of FIG. 8 and the real world top view of FIG. 9.

Figure 8:
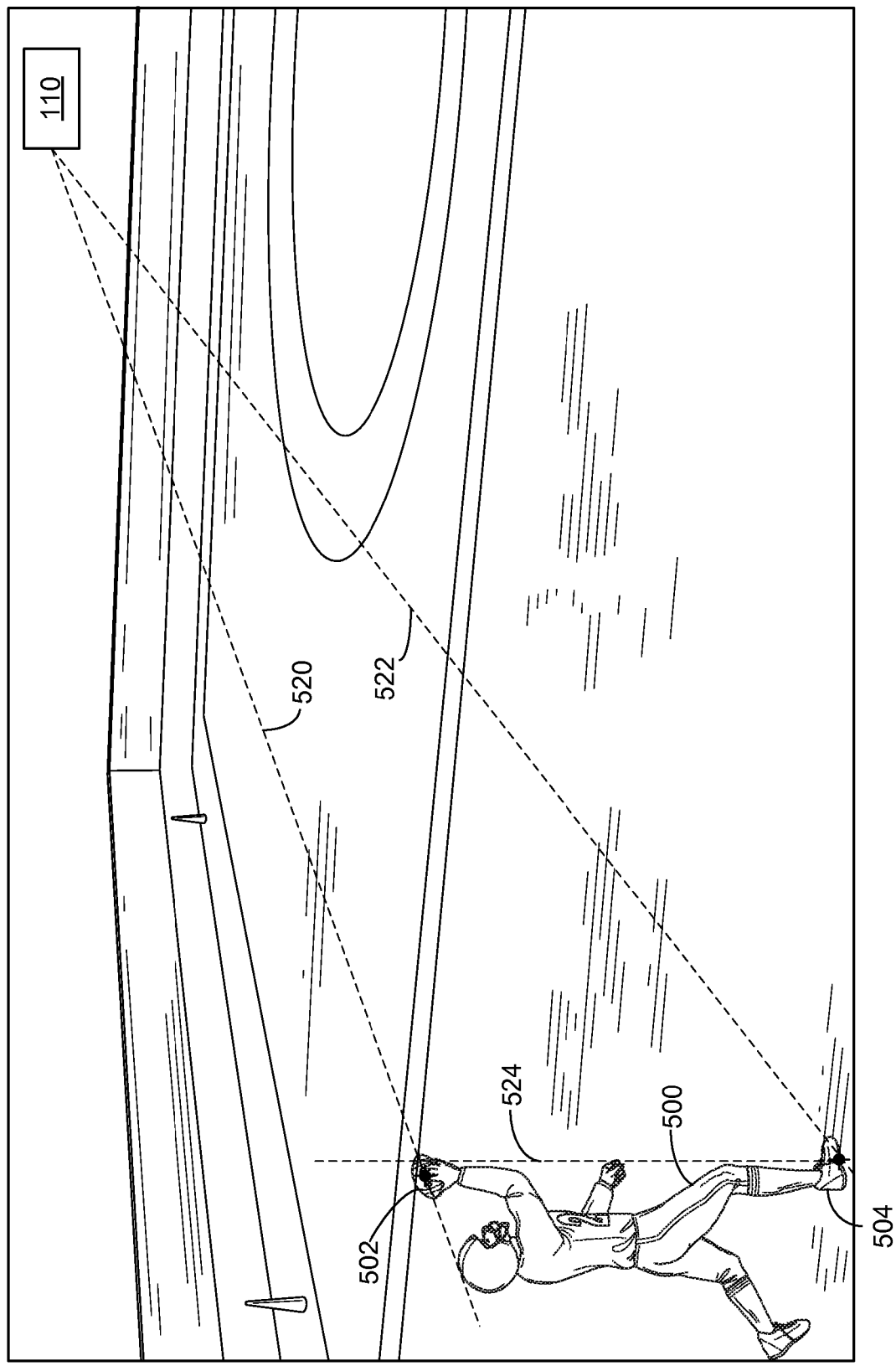
FIG. 8 is a 3-dimensional world view of the event depicted in the video frame of FIG. 7, showing the lines of position from a camera.
Figure 9:
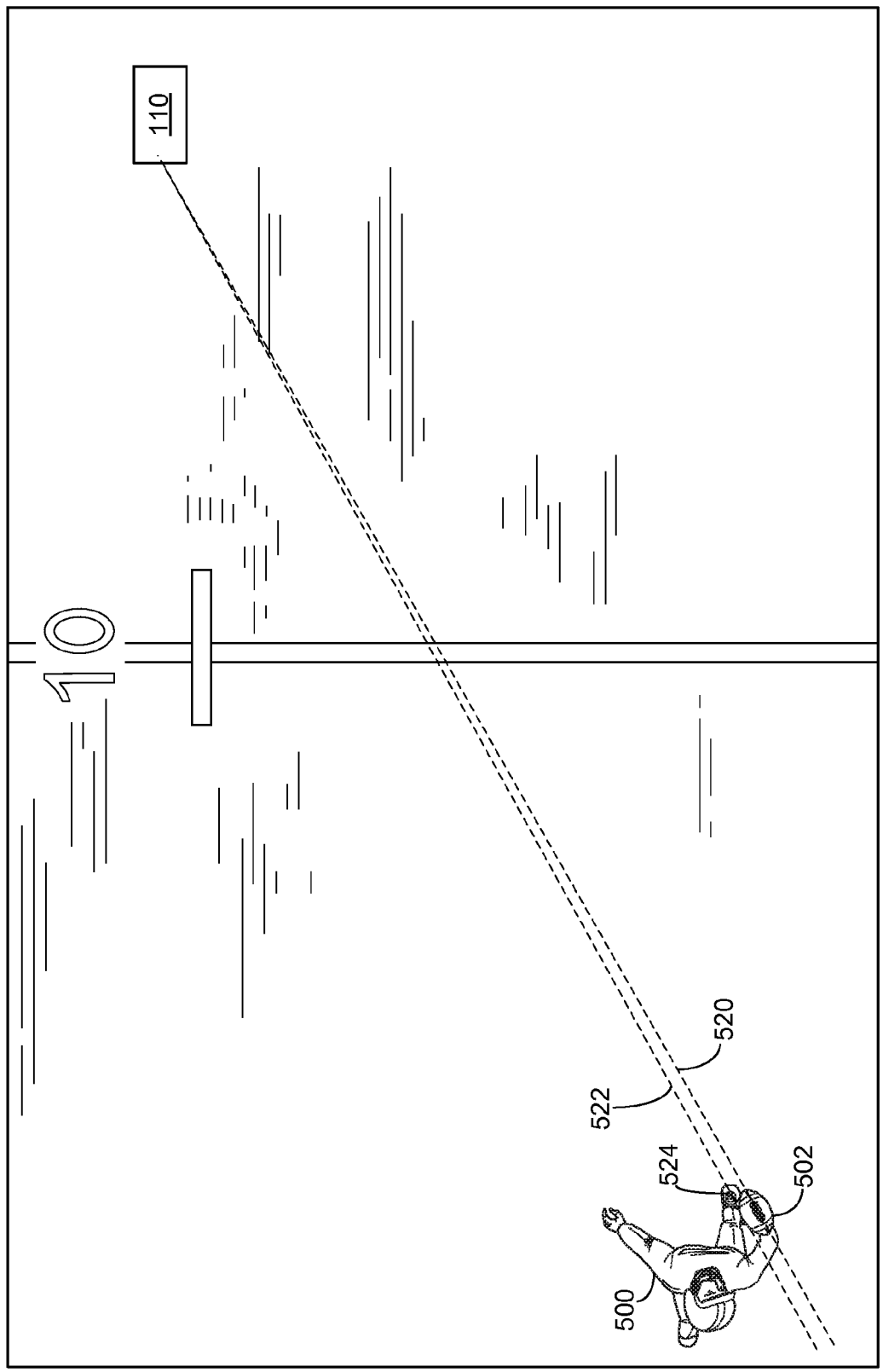
FIG. 9 is a top view of the world event depicted in the video frame of FIG. 7, showing the lines of position from a camera.
Figure 10:
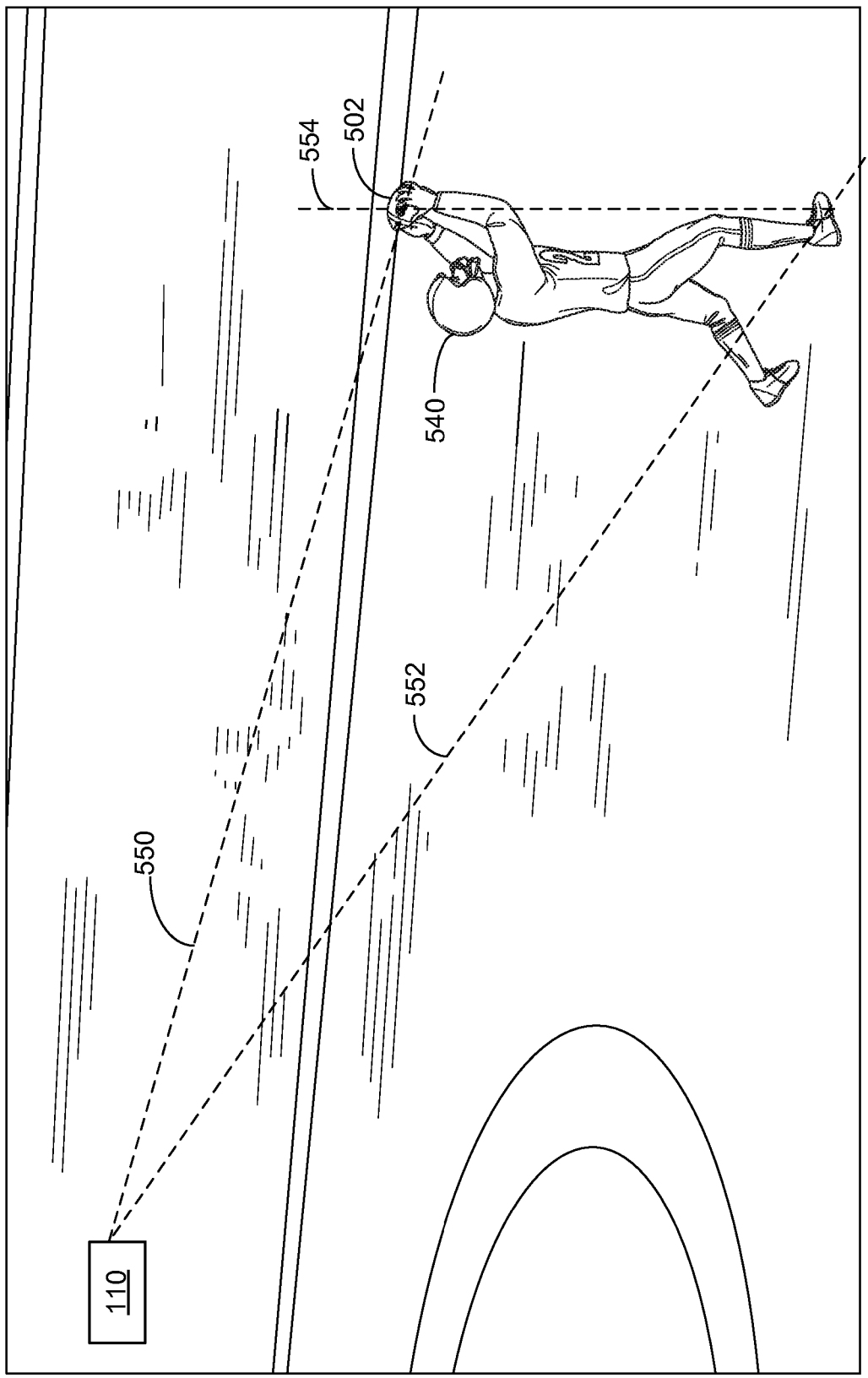
FIG. 10 is a 3-dimensional world view of the event at a second time later than the first time, showing the lines of position from a camera.

Step 208 begins with a calculation of a 3-dimensional line of position from the camera 110 through the real world point indicated by pixel ($s1_x$, $s1_y$). Conceptually, the line of position from camera 110 in the direction indicated by the screen coordinates ($s1_x$, $s1_y$) is calculated by converting from distorted to undistorted screen coordinates and then using the inverse of the transformation equations, for example, matrix M, determined during the set-up for camera 110. Such a line of position ray 520 is shown in FIGS. 8 and 9. This process of calculating line of position 520 is known. However, a mathematical derivation of the line of position 520 according to one embodiment is set forth below.

In order to calculate the line of position 520 from the screen coordinates ($s1_x$, $s1_y$) of the first object (e.g., the football), the screen coordinates are transformed to a world space object by converting from the distorted screen coordinates to undistorted screen coordinates by inverting equation (3). Then the world space object is calculated by inverting equation (1):

$$M^{-1}s = w, \quad (4)$$

$$w = \begin{pmatrix} x_s \\ y_s \\ z_s \\ w \end{pmatrix}, \quad s = \begin{pmatrix} s_x \\ s_y \\ 1 \\ 1 \end{pmatrix}$$

Dividing each of the first three components of w by the fourth component yields a reference point, Q, in 3-dimensional space that lies on the line of position ray 520 from the camera position in the direction indicated by the screen coordinates for the first object. The general equation for the line of position through the camera and the reference point may be described by a parametric equation:

$$P = O + \gamma L \quad (5)$$

where P is any point that is on the line of position, O is one particular point on the line of position, L is a vector in the direction of the line of position, and $\gamma$ is a real number.

Given this equation, O can be set to the camera 110 position. The camera position, O, can be calculated via:

$$c_s = M^{-1} e_4 \quad (6)$$

$$e_4 = \begin{pmatrix} 0 \\ 0 \\ 0 \\ 1 \end{pmatrix}.$$

$c_s$ can be normalized by dividing its first three components by the fourth component. Thus, the camera 110 position, O, is given by:

$$O = \left( \frac{c_{s1}}{c_{s4}}, \frac{c_{s2}}{c_{s4}}, \frac{c_{s3}}{c_{s4}} \right). \quad (7)$$

Finally, L may be computed as $L = Q - O$. (8)

The line of position 522 from camera 110 through the player 500's foot is computed in the same manner in step 232. Namely, the line of position from camera 110 in the direction indicated by the screen coordinates ($s2_x$, $s2_y$) is calculated by converting from distorted to undistorted screen coordinates and then using the inverse of the transformation equations determined during the set-up for camera 110.

The 3-dimensional position of the point corresponding to coordinates ($s2x$, $s2y$) is the intersection of line of position 522 with the geometric model of the field. The intersection of line of position 522 with the geometric model of the field is calculated in step 234. As the equation of the line of position 522 is known, and the equation for the geometric model of the field is known, the intersection of line of position 522 with the geometric model of the field is a quantifiable position which may be calculated by known processes. However, a derivation according to an embodiment of the invention is set forth below.

Referring initially to the general case of the intersection of a line with a plane, a plane in 3-dimensional space may be described by two vectors. The first is a point, Q, on the plane, and the second is a vector, n, that is perpendicular to the plane. In this case, any point, x, that is in the plane satisfies the equation:

$$(x - Q) \cdot n = 0. \quad (9)$$

The intersection of the line of position 522, represented by equation (5), with the plane represented by equation (9) is the point x given by:

$$x = O + \gamma L, \quad (10)$$

-continued $$\gamma = \frac{(Q-O) \cdot n}{L \cdot n}.$$

With respect to the specific case of the line of position intersecting a surface of a geometric model in x,y,z coordinate space, the surface may be expressed by the equation:

$$z=f(x,y). \quad (11)$$

In general, the intersection of line of position 522 with the surface described by z=f(x,y) is found by iteratively finding the intersection of planes defined by Q =(0,0,0), n=(0,0,1). In a first iteration, z can be set to 0; z=f(x,y)=0, so that Q =(0,0,0) and n=(0,0,1). The solution for x (equations (10)) then becomes x=(x,y,0), where x and y are the coordinates in the x and y direction respectively. Using this, a new value for the plane may be computed via the equation (11) for the surface of the field z=f(x,y), and the process repeated. This iterative process may be repeated one or more times depending on the degree of accuracy desired for the point of intersection of the line of position 522 with the geometric model of the field. This process results in the identification of the 3-dimensional position of the object in contact with the geometric model of the broadcast environment—foot 504 in the current example.

Next, in step 236, a 3-dimensional world vector directed straight up (i.e., parallel to the force of gravity along the z axis) is calculated extending from the 3-dimensional position identified in step 234. The resulting "up-vector" is shown at 524 in FIG. 8. Up-vector 524 is seen as a point in the top view of FIG. 9.

Conceptually, an assumption underlying the method of this embodiment is that the 3-dimensional position of the football 502 will be the point along line of position 520 that is closest to up-vector 524 through the identifiable position of player 500's foot. Thus, the point along line of position 520 that is closest to the up-vector 524 will be the 3-dimensional position of the object, football 502 in this instance. In step 238, the shortest distance between up-vector 524 and the line of position 520 through the football 502 is calculated. The method is known for identifying the points $P_1$ along a line $L_1$ and $P_2$ along line $L_2$, such that points $P_1$ and $P_2$ represent the points of closest approach between lines $L_1$ and $L_2$. However, mathematically, the point $P_1$ along line of position 520 that is closest to the up-vector 520 may in general be determined as follows.

Line of position 520 and up-vector 524 may be described by lines $L_1$ and $L_2$, respectively, such that points on those respective lines, $P_1$ and $P_2$, are given by the parametric equation set forth in equation (5) above:

$$P_1=O_1+\gamma_1 L_1 \quad (12)$$

$$P_2=O_2+\gamma_2 L_2 \quad (13)$$

where O is one particular point on the lines, L is a vector in the direction of the lines, and γ is a real number. For point $P_1$ representing the closest point of approach on line of position 520 to the up-vector 524, $\gamma_1$ in equation (12) is given by:

$$\gamma_1 = \frac{(O_1-O_2) \times L_2 \cdot (L_2 \times L_1)}{(L_2 \times L_1) \cdot (L_2 \times L_1)} \quad (14)$$

Using the above equations, the 3-dimensional point $P_1$ may be identified. The 3-dimensional point $P_1$ is the 3-dimensional location of football 502 (step 240). The time code from the selected frame may then be associated with the 3-dimensional position identified for the object to yield the 4-dimensional coordinates of the object 502 (step 242).

The above-described steps illustrate a method of identifying the coordinates of an object in world space, where the object is not on the geometric model of the environment, and where the coordinates are obtained from a single source image. The above identified embodiment may be expanded in a further embodiment to identify a trajectory of an object over time moving through world space, where the object is not on the geometric model of the environment, and where the coordinates are obtained from a single source image. Such an embodiment is described with reference to the flowchart of FIG. 6 and the illustrations of FIGS. 7 through 11. To illustrate the method steps described hereinafter, FIGS. 7 through 11 show an example where the present invention may be used to blend a graphic showing the progress of a football during a pass play where the football is thrown from one player and caught by another during a broadcast of the football game. The invention is not limited to such an embodiment and may encompass a variety of broadcast environments.

Figure 6:
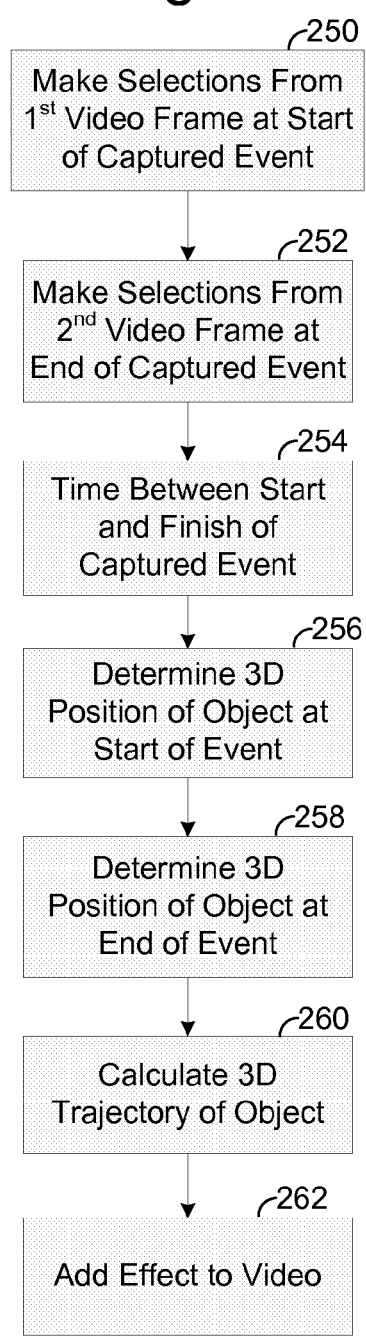
FIG. 6 is a flowchart for identifying the trajectory of an object in 3-dimensional space over time and adding a graphic to show the trajectory according to embodiments of the present invention.

Referring now to the flowchart of FIG. 6, in step 250, an operator selects a video frame at the start of the captured event. Step 250 in general comprises the steps 210 through 218 described above with respect to FIG. 4. In particular, an operator would review video frames from a given camera to identify the video frame showing the start of captured event, the time code of that frame may be recorded, the operator may click on a pixel (S1x, S1y) at the center of the object, and the operator may select a second pixel (S2x, S2y) where a portion of the player contacts the playing surface.

In step 252, the operator selects a second video frame showing the end of the captured event and repeats the steps shown in FIG. 4 for the second video frame. In step 254, using the time codes recorded on the first and second video frames at the start and end of the captured event, and the known video format and frame rates, the duration of the captured event is determined.

In step 258, the three-dimensional position of the object at the start of the captured event is determined. Step 258 includes the above-described steps 230 through 240 of FIG. 5 and as shown in FIGS. 7 through 9.

Those same steps are again repeated for the second video frame of the end of the captured event to determine the three-dimensional position of the object at the end of the captured event in step 258. In particular, referring to FIG. 10, using the two points selected in the second video frame (not shown) presenting the end of the captured event (step 252), a line of position 550 from the camera through the object is determined, a line of position 552 from the camera through a portion of player 540's body in contact with the field is determined, and an up-vector 554 from the intersection of line of position 552 with the field is determined. Using this information, the three-dimensional location of the football 502 at the end of the captured event may be determined as described above.

Using the known world starting and ending positions of the object in a captured event, and known physics relating to the flight of objects under the forces of the earth's gravitational field, drag, and other atmospheric effects, the trajectory of the object between the start and end of the event may be calculated in step 260. In general, knowing the 3-dimensional position of the object at the start and end of the captured event, an arbitrary coordinate system may be adopted where the object travels in a 2-dimensional x,y plane. The time of travel of the object is known (from step 254), and the distance the object has traveled in the x and y directions (in the arbitrarily-selected x,y plane) is known. Thus, using Newton's Second law for bodies in motion, together with the known atmospheric effects and coefficient of drag, the trajectory of the object at all times between the start and end of the captured event may be calculated in a known manner.

In an embodiment, an initial estimation of the trajectory may be calculated using just Newton's Second law and ignoring the effects of the atmosphere and drag. From these equations and the known time and distance of travel, an estimation of the initial velocity and angle of trajectory may be determined. Points along that estimation of trajectory may be used in a more complicated non-linear equation that accounts for atmospheric effects and the coefficient of drag. The mathematics for such a calculation are known. However in an embodiment, the more complicated non-linear equations of motion may be given by:

$$m\ddot{x} = -\frac{1}{2}\rho C_d A \sqrt{v_x^2 + v_y^2} v_x \hat{x}$$
$$m\ddot{y} = -\frac{1}{2}\rho C_d A \sqrt{v_x^2 + v_y^2} v_y \hat{y} - mg\hat{y} \quad (15)$$
$$v = v_x \hat{x} + v_y \hat{y} = \dot{x}\hat{x} + \dot{y}\hat{y}$$

where $\hat{x}$ and $\hat{y}$ are the axes of the arbitrary plane in which the football travels, $C_d$ is the coefficient of drag for the football with the nose pointed along the direction of motion, $\rho$ is the density of air, A is the cross sectional area of the football, m is the mass of the football and g is the gravitational acceleration. The atmospheric parameters may be measured once prior to the broadcast, and/or once every preset interval during the broadcast.

In order to solve the system of non-linear ordinary differential equations (15), the space-time coordinates, (x,y,z,t), of the football at the beginning and end of a pass are used, along with the elapsed time. This data in combination with the system of equations (15) constitutes a two point boundary value problem with a known solution.

In a further embodiment of the present invention, a more complicated model may be used that takes into consideration the effects of wind and other factors on the trajectory of the football. This model is no longer constrained within the two dimensions of an arbitrary plane. Wind, transverse to the direction of motion of the football, will move the football out of its otherwise 2-dimensional path.

In accordance with this model, an arbitrary Cartesian coordinate system may be adopted in which $\hat{x}$ may be the horizontal direction of motion of the football, $\hat{z}$ may be the vertical direction of motion of the football, and $\hat{y}$ is the direction of motion perpendicular to the $\hat{x}\,\hat{z}$ plane. The equations for motion then may be given by:

$$m\ddot{x} = \frac{1}{2}\rho A \|v_r\| \{C_d(v_{w_x} - v_{b_x}) + C_l(v_{w_z} - v_{b_y})\}\hat{x}$$
$$m\ddot{y} = \frac{1}{2}\rho A \|v_r\| \{C'_d(v_{w_y} - v_{b_y})\}\hat{y} \quad (16)$$
$$m\ddot{z} = -mg\hat{z} + \frac{1}{2}\rho A \|v_r\| \{C_d(v_{w_z} - v_{b_z}) + C_l(-v_{w_x} + v_{b_x})\}\hat{z}$$
$$\|v_r\| = \sqrt{(v_{w_x} - v_{b_x})^2 + (v_{w_y} - v_{b_y})^2 + (v_{w_z} - v_{b_z})^2}$$
$$v_b = \dot{x}\hat{x} + \dot{y}\hat{y} + \dot{z}\hat{z}$$

where $v_w$ is wind velocity, $C'_d$ is the coefficient of drag for a football with the nose pointed perpendicular to the direction of motion, $C_d$ is the coefficient of drag for a football with the nose pointed along the direction of motion, $C_l$ is the coefficient of lift for a football, $\rho$ is the density of air, A is the cross sectional area of the football, m is the mass of the football and g is the gravitational acceleration.

The system of equations (16), in combination with the initial and ending world coordinates of the football and elapsed time, again constitutes a two-point boundary value problem with a known solution. Alternatively, more data could be taken, and this data used in order to solve the new resultant system of equations and data. This becomes a non-linear least squares problem, which may be solved using standard techniques.

An example of additional data which may be used are intermediate positions/time of the object between the start and end positions/times. For example, the 2-dimensional screen space position of an object such as a football in flight may be selected at a given time. Using the above system of equations, the determined 4-dimensional position of the object is determined. This position may then be converted into 2-dimensional screen space, and compared with the actual position of the object selected on the screen at that time. Any deviation between the position determined by the model and the position noted from the 2-dimensional screen space may then be used to correct the model using known techniques such as the least squares method.

The above example corrected the model in 2-dimensional space. The same may be accomplished using the position of the object such as a football in 3-dimensional space. For example, the 2-dimensional screen space position of an object such as a football in flight may be selected at a given time. The 2-dimensional screen space is then transformed into a 3-dimensional line of position ray. The intersection of this 3-dimensional line of position with the identified real space plane of trajectory may be used to identify the real space position of the object at the given time. This 3-dimensional position may be compared against the 3-dimensional position of the object determined by the model for that time. Any deviation between the position determined by the model and the position identified by the intersection of the line of position with the object plane may then be used to correct the model using known techniques such as the least squares method.

In the embodiments described above, the model uses identified start and end positions of an object in 3-dimensional space to determine a trajectory of the object. In a further embodiment of the present invention, the trajectory of an object may be determined using the known starting position of the object, and then a plurality of lines of position through the object over time. Such an embodiment need not use the end position of the object. In accordance with this embodiment, the system determines the known 3-dimensional starting position of the object.

Thereafter, the trajectory of the object may be modeled using a best guess as to the parameters necessary to model the trajectory. This best guess model is then used by the system to determine the 3-dimensional position of the object at, for example, time $t_2$. That 3-dimensional position is then converted into 2-dimensional screen space as described above. The actual 2-dimensional screen space of the object at time $t_2$ is noted. Any deviation between the position determined by the model and the position noted from the 2-dimensional screen space may then be used to correct the model using known techniques such as the least squares method. This process may be repeated for subsequent times $t_3$, $t_4$, etc., until the model accurately represents the trajectory of the object.

This technique may be advantageously used to determine the 3-dimensional flight or movement of objects such as baseballs, footballs, etc., over time in broadcasts of such sporting events. In events such as baseball, much is known about the initial flight of a pitched baseball (such as general direction and general speed), thus allowing for a reasonably good initial best guess as to the trajectory of the baseball.

Figure 11:
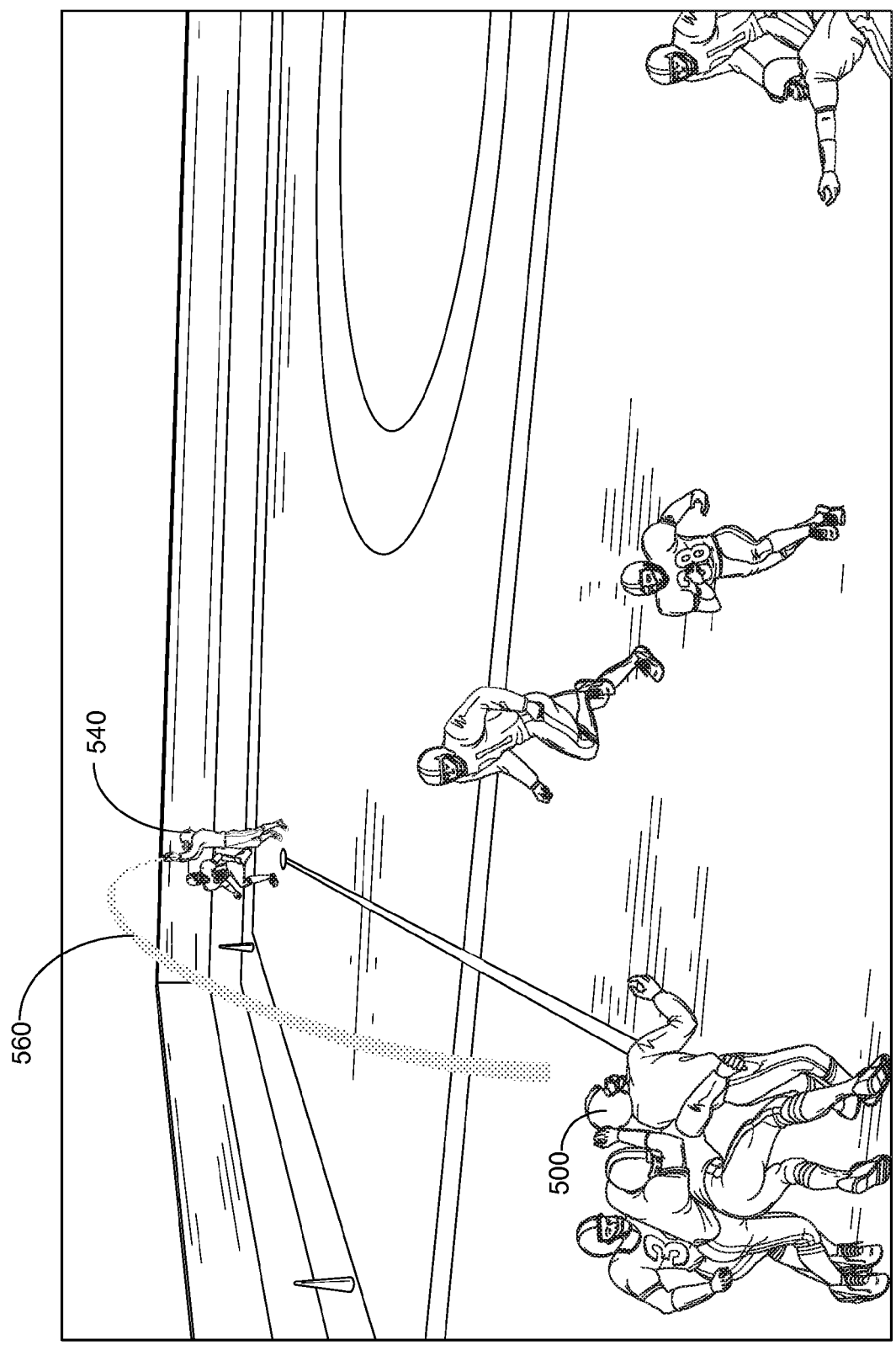
FIG. 11 is perspective view of a video frame of a sporting event showing a graphic added to the video frame according to embodiments of the present invention.

Once step 260 is completed and the world, 4-dimensional trajectory of the object is known over all time for the captured event, a graphic effect may be blended into a video replay of the captured event in step 262 to highlight or otherwise make visible the trajectory of the object as part of a video replay. For example, as shown in FIG. 11, the trajectory of the object while in flight may be shown as a smoke contrail 560 behind the object as it moves. Various other visible representations of the trajectory may used in the video replay in addition to or instead of the smoke contrail 560.

In particular, for each frame and time in the replay of a captured event, the specific 4-dimensional location of the object is known. The 4-dimensional positions at earlier times in the trajectory of the object are also known. In order to show the trajectory, the 4-dimensional location of the object in the current frame, as well as the 4-dimensional location(s) of the object along the trajectory at previous times, are converted from 3-dimensional world space into 2-dimensional screen pixel space. This is accomplished using the transformation equations, and correction for distortion. Thus, for a given frame during the replay, the 2-dimensional screen pixels of the trajectory are known. These identified pixels may be altered to add a graphic to the replay as shown in FIG. 11. Additionally, to give the graphic some thickness and to enhance the visibility of the added graphic, pixels within a given radius of each identified pixel may also be altered in the same manner. The process of altering pixels to add or blend a graphic to video is known and described for example in Applicants' '550 patent, previously incorporated by reference.

A camera may move while capturing an event from start to finish. Because the world coordinates of each point along a trajectory are known, and because the position of the camera while it moves during the captured event is known, the 2-dimensional locations of the pixels corresponding to the trajectory may be identified for each video frame, and accurately recreated in each frame during the video replay, even though the camera perspective changes. That is, the added graphic of the trajectory will change during the video replay of the event as the camera perspective changes. Thus, the added graphic of the trajectory will be shown in the replay from the side when the camera shooting the video is off to the side of the trajectory of the object, and the added graphic of the trajectory will be shown in the replay from behind (or in front) when the camera is behind (or in front) of the object. Moreover, distance perspective is preserved. Points along the trajectory which are closer to the camera will appear larger in the graphic than points along the trajectory that are farther from the camera.

Embodiments of the invention have been described above for determining the 4-dimensional position of an object such as a football during a broadcast of a football game. It will be understood that the method described herein may also be used to track the movement and trajectory of a player on a playing field, such as for example a football player running a pass route. The player's position in real space may be determined as described above. The case may at times be simplified in that the player's foot may in general be in contact with the known geometry of the playing surface. Once the player's real space position over a time $t_1$ to $t_2$ is determined, that information may be used to add a graphic to a video showing the player's trajectory over time, showing a straight path between the player's start and end positions, as well as providing overall distance and average speed measurements. The trajectory of other player's may be tracked and used in the same way.

Embodiments of the invention have been described above with respect to measuring the 4-dimensional properties of a football when thrown, and the 4-dimensional properties of a trajectory of a football during a pass play. In order to accomplish this, the projection along the z-axis (direction of gravity) of the ball's position onto the playing field is first measured by estimating this position to be at or near a player's foot on the playing surface. Then the ray going through the ball's location is measured. Finally, the point along the ray going through the ball's location that is closest to a vertical ray that goes through the measured point on the field is computed via equations (12) and (14) above.

It is to be understood, however, that the present invention is not limited to the above-disclosed embodiments. In the general case, the 3-dimensional location of an object above a known geometry (surface, line or point) of known geometry can be measured, using a single video image from a camera calibrated to the surface, line or point by first computing a ray, L1, that goes through the object of interest. Next, the point on the known geometry is found that corresponds to the projection of the object of interest onto the surface in some known way. A typical example would be the projection of the point onto the geometric model along some known direction, possibly either one of the principal axes or the surface normal at the point of projection from the camera. Once the point on the model is found, a ray, L2, is created that goes through the point on the model in the direction of the projection. Ray L2 may be computed before ray L1 in alternative embodiments. Finally, the location of the object of interest is computed by P1 as detailed in equations (12) and (14) above.

In an embodiment described above, the trajectory of an object during a captured event is determined where the object starts above, or otherwise not on, a known geometric model, and ends above, or otherwise not on, the known geometric model. In an alternative embodiment, one of the start point or end point of the object during a captured event may be on the known geometric model. Thus, as an example, during a kick-off in a broadcast football game, the football may begin on the field (on the known geometric model) and may be kicked to a player who catches it above the field. In this embodiment, the time and starting point of the football may be identified in 3-dimensional space by known methods (intersection of a line of position through ball with the geometric model of the playing field), and the time and end point where the football is caught may be determined by methods of the invention described above. Once the start and end points are determined and the trajectory modeled as described above, a graphic may be added showing the flight of the football.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of determining a 3-dimensional position of an object within an environment having a known geometry, the method comprising the steps of:
  (a) determining, at a first time, a 3-dimensional location of the object not residing on the known geometry, said determination made using points selected from a first video image, at least a portion of the known geometry, and lines of position extending from one or more cameras capturing the first image in the directions of respective 3-dimensional projections of the points selected from the first video image;
  (b) determining, at a second time different than the first time, a 3-dimensional location of the object not residing on the known geometry, said determination made using points selected from a second video image, at least a portion of the known geometry, and lines of position extending from one or more cameras capturing the second image in the directions of respective 3-dimensional projections of the points selected from the second video image;
  (c) determining 3-dimensional locations of the object at times of video frames between the first and second times, said step (c) including the steps of:
    (c1) using the 3-dimensional location of the object determined in said step (a),
    (c2) using the 3-dimensional location of the object determined in said step (b), and
    (c3) using equations defining the trajectory of the object in three dimensions at known times between the first time and the second time, said equations accounting for at least one of drag and atmospheric conditions affecting the trajectory of the object;
  (d) converting 3-dimensional locations of the object determined in said step (c) to a position of the object in video frames between the first video image and the second video image; and
  (e) modifying video frames between the first video image and the second video image based on the positions of the object identified in said step (d) for different times in order to emphasize the object in the video frames between the first video image and the second video image.

2. The method of determining a 3-dimensional position recited in claim 1, said steps (a) and (b) comprising capturing the first and second video images from a single camera.

3. The method of determining a 3-dimensional position recited in claim 1, said step (c3) including use of equations accounting for the effects of drag and wind on the object.

4. The method of determining a 3-dimensional position recited in claim 3, said step (c3) including use of equations accounting for effects in addition to the effects of drag and wind on the object.

5. The method of determining a 3-dimensional position recited in claim 3, said step (c3) including use of equations accounting for the effects of lift on the object.

6. The method of determining a 3-dimensional position recited in claim 1, said step (c3) including the step of calculating different trajectories of the object by using different equations which account for the effects of drag and wind on the object to differing degrees.

7. The method of determining a 3-dimensional position recited in claim 6, said step of calculating different trajectories comprising the steps of calculating a first trajectory using equations which constrain the trajectory of the object to within a 2-dimensional plane, and calculating a second trajectory using equations which do not constrain the trajectory of the object to within a 2-dimensional plane.

8. The method of determining a 3-dimensional position recited in claim 6, said step of calculating different trajectories of the object by using different equations comprising the steps of using a first set of equations to obtain a best estimate of parameters of the trajectory and using a second set of equations to obtain a best visual enhancement of the object in the video frames.

9. The method of determining a 3-dimensional position recited in claim 1, the method of determining trajectory of an object comprising the step of determining the trajectory of a football in flight.

10. The method of determining a 3-dimensional position recited in claim 1, the method of determining trajectory of an object comprising the step of determining the trajectory of a baseball in flight.

11. The method of determining a 3-dimensional position recited in claim 1, the method of determining trajectory of an object comprising the step of determining the trajectory of a soccer ball in flight.

12. The method of determining a 3-dimensional position recited in claim 1, wherein the first time is earlier than the second time.

13. The method of determining a 3-dimensional position recited in claim 1, wherein the first time is later than the second time.

14. The method of determining a 3-dimensional position recited in claim 1, said first video image in said step (a) and said second video image in said step (b) captured by a first camera, the video frames modified in said step (e) rendered from a perspective of the first camera.

15. The method of determining a 3-dimensional position recited in claim 1, said first video image in said step (a) and said second video image in said step (b) captured by a first camera, the video frames modified in said step (e) rendered from a perspective of a second camera different than the first camera.

16. A method of determining a 3-dimensional position of an object within an environment having a known geometry, the method comprising the steps of:
  (a) determining, at a first time, a 3-dimensional location of the object not residing on the known geometry, said determination made using points selected from a first video image, at least a portion of the known geometry, and lines of position extending from one or more cameras capturing the first image in the directions of respective 3-dimensional projections of the points selected from the first video image;
  (b) determining, at a second time different than the first time, a 3-dimensional location of the object not residing on the known geometry, said determination made using points selected from a second video image, at least a portion of the known geometry, and lines of position extending from one or more cameras capturing the second image in the directions of respective 3-dimensional projections of the points selected from the second video image;
  (c) determining a 3-dimensional location of the object at a third time between the first and second times, said step (c) including the steps of:
    (c1) using the 3-dimensional location of the object determined in said step (a),
    (c2) using the 3-dimensional location of the object determined in said step (b), and
    (c3) using equations defining the trajectory of the object in three dimensions at the third time, said equations accounting for at least one of drag and atmospheric conditions affecting the trajectory of the object;

(d) converting a 3-dimensional location of the object determined in said step (c) to a position of the object in a video frame taken at the third time; and (e) modifying a video frame at the third time based on the position of the object identified in said step (d) in order to emphasize the object in the video frame at the third time.

17. The method of determining a 3-dimensional position recited in claim 16, further comprising the step (f) of using parameters in addition to those employed in steps (c1), (c2) and (c3) to verify and, if necessary, correct the position of the object at the third time.

18. The method of determining a 3-dimensional position recited in claim 17, said step (f) comprising the steps of:
   (f1) receiving a selection of the object from a third video frame taken at the third time,
   (f2) comparing the selected position of the object from the third video frame against the position of the video frame obtained in said step (d), and
   (f3) correcting, if necessary, the position of the object determined in said step (c) based on said steps (f1) and (f2).

19. The method of determining a 3-dimensional position recited in claim 17, said step (f) comprising the steps of:
   (f1) determining, at the third time, a 3-dimensional location of the object, said determination made using points selected from a third video image of the object at the third time, at least a portion of the known geometry, and lines of position extending from one or more cameras capturing the third image in the directions of respective 3-dimensional projections of the points selected from the third video image;
   (f2) comparing the selected position of the object from the third video frame against the position of the video frame obtained in said step (d), and
   (f3) correcting, if necessary, the position of the object determined in said step (c) based on said steps (f1) and (f2).

20. The method of determining a 3-dimensional position recited in claim 16, said steps (a) and (b) comprising capturing the first and second video images from a single camera.

21. The method of determining a 3-dimensional position recited in claim 16, said step (c3) including use of equations not constrained in a 2-dimensional plane and accounting for the effects of drag and wind on the object.

22. The method of determining a 3-dimensional position recited in claim 19, said step (c3) including use of equations not constrained in a 2-dimensional plane and accounting for effects in addition to the effects of drag and wind on the object.

23. The method of determining a 3-dimensional position recited in claim 21, said step (c3) including use of equations not constrained in a 2-dimensional plane and accounting for the effects of lift on the object.

24. The method of determining a 3-dimensional position recited in claim 16, wherein the first time is earlier than the second time.

25. A method of determining a 3-dimensional position of an object within an environment having a known geometry, the method comprising the steps of:
   (a) determining, at a first time, a 3-dimensional location of the object not residing on the known geometry, said determination made using points selected from a first video image captured by a first camera, at least a portion of the known geometry, and lines of position extending from the first camera in the directions of respective 3-dimensional projections of the points selected from the first video image;
   (b) determining, at a second time different than the first time, a 3-dimensional location of the object not residing on the known geometry, said determination made using points selected from a second video image captured by the first camera, at least a portion of the known geometry, and lines of position extending from the first camera in the directions of respective 3-dimensional projections of the points selected from the second video image;
   (c) determining a 3-dimensional location of the object at a third time between the first and second times, said step (c) including the steps of:
      (c1) using the 3-dimensional location of the object determined in said step (a),
      (c2) using the 3-dimensional location of the object determined in said step (b), and
      (c3) using equations defining the trajectory of the object in three dimensions at the third time, said equations accounting for at least one of drag and atmospheric conditions affecting the trajectory of the object;
   (d) converting a 3-dimensional location of the object determined in said step (c) to a position of the object in a video frame taken at the third time; and
   (e) modifying a video frame from a second camera different than the first camera at the third time based on the position of the object identified in said step (d) in order to emphasize the object in the video frame from the second camera at the third time.

26. The method of determining a 3-dimensional position recited in claim 25, said step (c3) including use of equations not constrained in a 2-dimensional plane and accounting for the effects of drag and wind on the object.

27. The method of determining a 3-dimensional position recited in claim 26, said step (c3) including use of equations not constrained in a 2-dimensional plane and accounting for effects in addition to the effects of drag and wind on the object.

28. The method of determining a 3-dimensional position recited in claim 26, said step (c3) including use of equations not constrained in a 2-dimensional plane and accounting for the effects of lift on the object.

29. A method of determining a 3-dimensional position of an object within an environment having a known geometry, the method comprising the steps of:
   (a) determining, at a first time, a 3-dimensional location of the object not residing on the known geometry using a first video image including an image of the object and at least a portion of the known geometry, said step (a) including the steps of:
      (a1) receiving a selection of first and second image points from the first image, the first image point corresponding to a position of the object in the first image at the first time,
      (a2) calculating first and second rays in 3-dimensional space, the first and second rays representing lines of position from a camera from which the first video image was captured and passing through first and second real world points indicated by the first and second image points,
      (a3) determining an intersection of the second ray with the known geometry in 3-dimensional space,
      (a4) calculating a third ray extending in a known direction from the intersection determined in said step (a3), and (a5) calculating a location of the first image point in real world space at the first time by the location on the first ray that represents the point of closest approach of the first ray to the third ray;

(b) determining, at a second time different than the first time, a 3-dimensional location of the object not residing on the known geometry using a second video image including an image of the object and at least a portion of the known geometry, said step (b) including the steps of:

(b1) receiving a selection of third and fourth image points from the second image, the third image point corresponding to a position of the object in the second image at the second time, (b2) calculating fourth and fifth rays in 3-dimensional space, the fourth and fifth rays representing lines of position from a camera from which the second video image was captured and passing through third and fourth real world points indicated by the third and fourth image points, (b3) determining an intersection of the fifth ray with the known geometry in 3-dimensional space, (b4) calculating a sixth ray extending in a known direction from the intersection determined in said step (b3), and (b5) calculating a location of the third image point in real world space at the second time by the location on the fourth ray that represents the point of closest approach of the fourth ray to the fifth ray;

(c) determining a 3-dimensional location of the object at a third time between the first and second times, said step (c) including the steps of:

(c1) using the 3-dimensional location of the object determined in said step (a), (c2) using the 3-dimensional location of the object determined in said step (b), and (c3) using equations defining the trajectory of the object at the third time, said equations accounting for drag and atmospheric conditions, including at least wind, affecting the trajectory of the object and said equations not constrained within two dimensions;

(d) determining, at the third time, a 3-dimensional location of the object, said determination made using points selected from a video image of the object at the third time, at least a portion of the known geometry, and lines of position extending from one or more cameras capturing the third image in the directions of respective 3-dimensional projections of the points selected from the third video image; and (e) modifying the third video frame based on the position of the object identified in said steps (c) and (d) in order to emphasize the object in the video frame at the third time.

30. The method of determining a 3-dimensional position recited in claim 29, said method determining the position of at least one of a football in flight, a baseball in flight and a soccer ball in flight.

31. The method of determining a 3-dimensional position recited in claim 29, wherein the first time is earlier than the second time.

32. A method of determining a 3-dimensional position of an object within an environment having a known geometry, the method comprising the steps of:

(a) determining, at a first time, a 3-dimensional location of the object not residing on the known geometry, said determination made using points selected from a first video image captured by a first camera, at least a portion of the known geometry, and a first set of lines of position extending from the first camera in the directions of respective 3-dimensional projections of the points selected from the first video image;

(b) determining a plurality of lines of position, different than the first set of lines of position, through the object from the first camera at each of a plurality of times different than the first time;

(c) determining 3-dimensional positions of a trajectory of the object at the plurality of times, said step (c) including the steps of:

(c1) using the 3-dimensional location of the object determined in said step (a), (c2) using the plurality of lines of position determined in said step (b), and (c3) using equations defining the trajectory of the object at the plurality of times;

(d) converting a 3-dimensional location of the object determined at each of the plurality of times in said step (c) to a positions of the object in video frames taken at each of the plurality of times; and (e) modifying at least one video frame of the video frames taken in said step (d) based on the position of the object identified for the at least one video frame in said step (d) in order to emphasize the object in the at least one video frame.

33. The method of determining a 3-dimensional position recited in claim 32, further comprising the step (f) of correcting the 3 dimensional positions of the trajectory by the steps of:

(f1) comparing the 2-dimensional location of the object at a given time of the plurality of times determined in said step (d) against the actual 2-dimensional position of the object shown in the video frame at the given time, and (f2) correcting the 3-dimensional position of the object at the given time based on the comparison in said step (f1).

34. The method of determining a 3-dimensional position recited in claim 32, wherein the equations in said step (c3) are not constrained to a planar trajectory in 2-dimensions.

35. The method of determining a 3-dimensional position recited in claim 34, wherein the equations in said step (c3) take into consideration at least one of drag, wind and other atmospheric conditions.

* * * * *